United States Patent [19]

Gibson et al.

[11] 4,176,546

[45] Dec. 4, 1979

[54] AIRCRAFT INSTRUMENTS

[75] Inventors: Harry Gibson, Tewkesbury; John W. D. Jones, Stonehouse, both of England

[73] Assignee: Smiths Industries Limited, London, England

[21] Appl. No.: 963,066

[22] Filed: Nov. 22, 1978

Related U.S. Application Data

[63] Continuation-in-part of Ser. No. 825,754, Aug. 18, 1977, abandoned.

[51] Int. Cl.² ............................................ G01C 21/10
[52] U.S. Cl. ..................................... 73/182; 116/300; 116/DIG. 43
[58] Field of Search ...................... 73/182, 183, 178 R, 73/178 T, 181; 116/DIG. 43, 129 T, 129 R, 300

[56] References Cited

U.S. PATENT DOCUMENTS 3,453,883  7/1969  Caggia .................................. 73/182

Primary Examiner—Donald O. Woodiel
Attorney, Agent, or Firm—Pollock, Vande Sande and Priddy

[57] ABSTRACT

An aircraft-speed indicating instrument has an index which is movable against a scale to provide a reading of airspeed, and a digital indicator which is selectively operable to provide a digital reading of either Mach number or the airspeed. The index and the digital indicator are driven by respective control systems supplied with a multiplexed electrical signal containing information representative of both Mach number and airspeed. Each control system includes gating means which is operable to pass only those parts of the multiplexed signal necessary for the associated control means to provde the desired reading.

9 Claims, 2 Drawing Figures

AIRCRAFT INSTRUMENTS

CROSS-REFERENCE TO RELATED APPLICATION

This application is a continuation-in-part of prior copending application Ser. No. 825,754, filed Aug. 18, 1977, for Aircraft Instruments, now abandoned.

This invention relates to aircraft instruments and is especially concerned with aircraft-speed indicating instruments.

The speed of an aircraft is in general indicated to the pilot in terms of both Mach number and airspeed—indicated airspeed or true airspeed. For this purpose use is frequently made of a form of indicating instrument commonly referred to as a combined-speed indicator, in which the airspeed indication is provided in analogue terms by a pointer that is rotated over the instrument dial against a calibrated scale, whereas Mach number is indicated in digital terms by a digital-drum counter that is visible through a window in the dial. Although the analogue representation of airspeed is normally adequate from the pilot's point of view there are certain operations where, either for general convenience or for greater speed and accuracy of reading, it would be of assistance to have recourse to a digital presentation. It is an object of the present invention to provide a form of aircraft speed-indicating instrument that may be used to provide such assistance.

According to one aspect of the present invention there is provided an aircraft-speed indicating instrument including an index that is movable against a scale to provide a reading of airspeed, and a digital indicator, and wherein the digital indicator is arranged to provide selectively either a digital reading of Mach number or of said airspeed.

Thus with the instrument according to the invention, it is possible simply by selection to indicate airspeed in digital terms in place of the digital indication of Mach number. Furthermore, provided it is arranged that there is no interruption of the indication of airspeed provided by the index when the selection is made, the instrument is capable of providing indication of the airspeed variable in both analogue and digital terms at the same time.

The readings provided by said index and said digital indicator may be controlled by first and second control means respectively, in which case said first control means may be selectively operable to provide an output to said digital indicator indicative of either Mach number or airspeed.

The said first control means may be supplied with a signal containing information representative of both Mach number and airspeed, and may also include first gating means and first responsive means, the said first gating means being selectively operable to pass to the said first responsive means either those parts of said signal which contain information representative of Mach number or those parts of said signal which contain information representative of airspeed.

Preferably, said signal comprises a multiplexed electrical signal. The instrument may include gate operating means providing first and second pulsed gating signals which are synchronized with those parts of the multiplexed signal containing information representative of Mach number and those parts of the multiplexed electrical signal containing information representative of airspeed respectively, and switch means for selectively supplying either said first or said second pulsed gating signal to the said first gating means of the first control means thereby to operate said first gating means and pass to said first responsive means those parts of said multiplexed electrical signal representative of Mach number or airspeed in dependence upon the setting of the switch means.

The said second control means may be supplied with said multiplexed electrical signal, and may include second gating means and second responsive means, the said second gating means being operable to pass to the said second responsive means only those parts of the multiplexed electrical signal which contain information representative of airspeed. In this case, the said second gating means may be supplied with said second pulsed gating signal from said gate operating means thereby to operate said second gating means and pass to the said second responsive means only those parts of the multiplexed electrical signal which contain information representative of airspeed.

The digital indicator may be a digital-drum counter, but may alternatively be provided by an electronic digital-display device.

An aircraft-speed indicating instrument in accordance with the present invention will now be described, by way of example, with reference to the accompanying drawings, in which.

Figure 1:
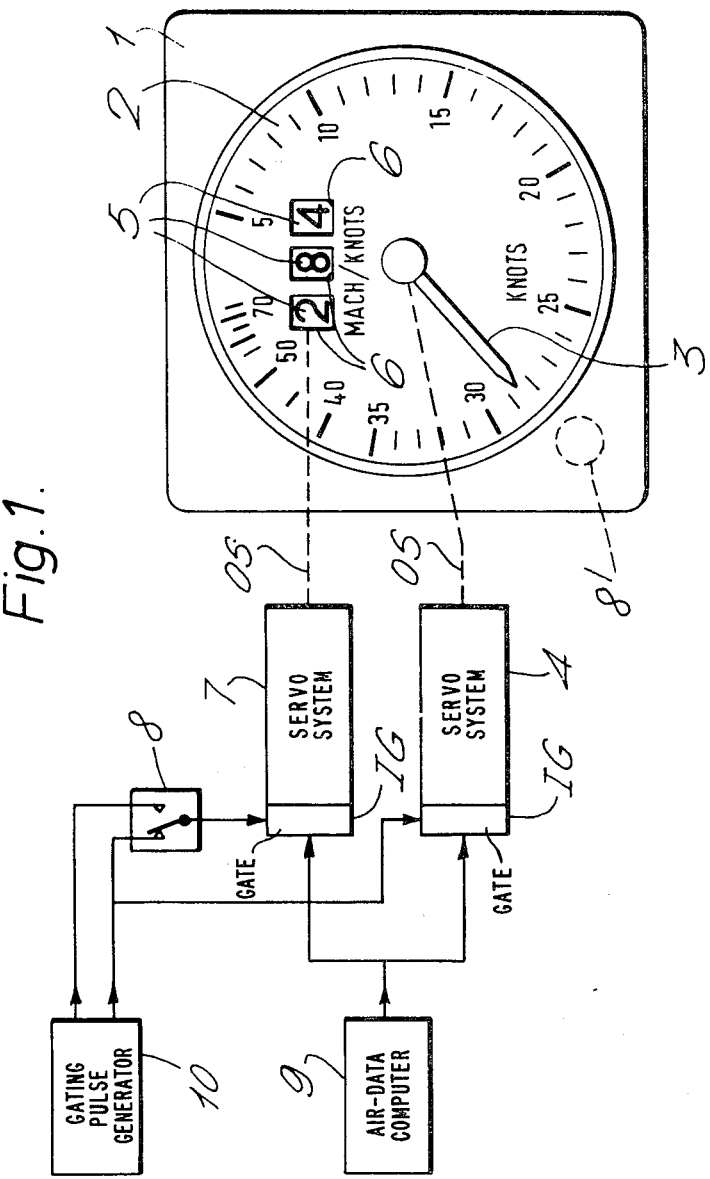
FIG. 1 is a schematic representation of the instrument.

Referring to FIG. 1, the dial 1 of the instrument bears a circular scale 2 calibrated in terms of airspeed (indicated airspeed or true airspeed) in knots. An index in the form of a pointer 3 is mounted centrally of the scale 2 and is driven in rotation from the output shaft OS of a servo system 4, to provide an appropriate reading of airspeed against the scale calibrations. The scale 2 is calibrated in accordance with the airspeed range appropriate to the aircraft in which the instrument is installed and is shown by way of example in FIG. 1 suitably calibrated for a subsonic aircraft.

As with conventional combined-speed indicating instruments providing readings of both airspeed and and Mach number, a digital-drum counter 5 is mounted behind the dial 1 with each drum visible through an individual section of a window 6 within the compass of the scale 2. Drive to the digital-drum counter 5 is provided from the output shaft OS of a second servo system 7, however with the present instrument the digital reading provided within the window 6 may be, selectively, of either Mach number or airspeed in knots. In this respect the instrument is provided with a two-position selector switch 8, and it is the setting of the switch 8 effected by the pilot, that determines whether the counter 5 is driven by the servo system 7 in accordance with Mach number or in accordance with airspeed.

The two servo systems 4 and 7 are supplied with binary-coded electric signals representative of Mach number and airspeed from an air-data computer 9. The computer 9 computes inter alia the value of Mach number and airspeed repeatedly, using measurements of the static and dynamic air-pressures sensed by pitot and static sensors (not shown) installed on the aircraft. The results of the successive up-dated computations of each variable, Mach number and airspeed, are signalled from the computer 9 to both servo systems 4 and 7 in time-division multiplex with the results applicable to the other variable.

Pulse trains synchronized to the output from the computer 9 and appropriate for gate-selection of the Mach number and airspeed representations, respectively, are supplied by a gating-pulse generator 10. The gating-pulse train appropriate to selection of the successive airspeed representations is supplied to an input gate IG of the servo system 4 and also to the selector switch 8. The other gating-pulse train, appropriate to selection of the successive Mach-number representations, is however supplied only to the selector switch 8. According to the setting of the switch 8 either the gating-pulse train appropriate to Mach-number, or that appropriate to airspeed, is supplied to an input gate IG of the servo system 7.

The two servo systems 4 and 7 drive the pointer 3 and counter 5, respectively, in accordance with the representations selected by their individual input gates IG. Thus the servo system 4 drives the pointer 3 in accordance with the airspeed representations only, whereas the servo system 7 drives the counter 5 in accordance with either the Mach-number or the airspeed representations, depending on the setting of the switch 8. With one setting of the switch 8 the instrument accordingly provides a conventional Mach-airspeed indication, with the counter 5 providing a digital reading of Mach number and the pointer 3 an analogue reading of airspeed. On the other hand, with the other setting of the switch 8 (illustrated in FIG. 1) the instrument provides indication of airspeed only, the counter 5 providing a reading in digital form corresponding to the analogue reading providing by the pointer 3.

The manner in which the digital reading of Mach number is displayed by the counter 5 is in accordance with accepted practices and is very much dependent on the type of aircraft in which the instrument is installed and also the particular requirements of the aircraft manufacturer.

Mach number in digital form is normally displayed to either two or three decimal places for subsonic aircraft, depending on the requirements of the aircraft manufacturer, and to two decimal places for supersonic aircraft. In the particular embodiment of the instrument shown in FIG. 1, the counter 5 is shown as having three digital drums and is ideally suited therefore to displaying the value of Mach number to either two or three decimal places in aircraft incapable of reaching Mach 1 and to two decimal places in aircraft which are capable of exceeding Mach 1.

When installed in an aircraft that is capable of travelling only at speeds less than Mach 1, the instrument may be arranged such that the three digit drums of the counter 5 are driven in accordance with appropriately computed signals supplied to the servo system 7 to display Mach number to three decimal places. As an example of a typical three decimal place display, the counter 5 may display the numbers "602" (representing Mach 0.602). Alternatively, the instrument may be arranged to display Mach number to only two decimal places with, for example, either the most significant digit drum of the counter 5 continuously displaying "0" or with the least significant digit drum being blanked off by a flag automatically upon appropriately setting the switch 8. As examples of typical two decimal place displays, the counter 5 may display the numbers "060" (representing Mach 0.60) or the numbers "60-" (representing Mach 0.60).

When installed in an aircraft that is capable of speeds in excess of Mach 1, the instrument is arranged so that the three digit drums of the counter 5 are used to display the value of Mach number to two decimal places in accordance with known practice. For example, the numbers "091" and "124" displayed by the digit drums of the counter 5 would represent Mach 0.91 and Mach 1.24 respectively.

It will be appreciated that if, for example, it is desired to display Mach numbers above Mach 1 to three decimal places or airspeeds in excess of 999 knots, a drum counter having four digit drums may be employed.

Each servo system 4 and 7 may be provided in accordance with the invention of co-pending U.K. Patent Application No. 52927/74 corresponding to Jones et al U.S. Pat. No. 4,066,946 issued Jan. 3, 1978, for "Servo Systems," and may have the specific form illustrated in FIG. 2.

Figure 2:
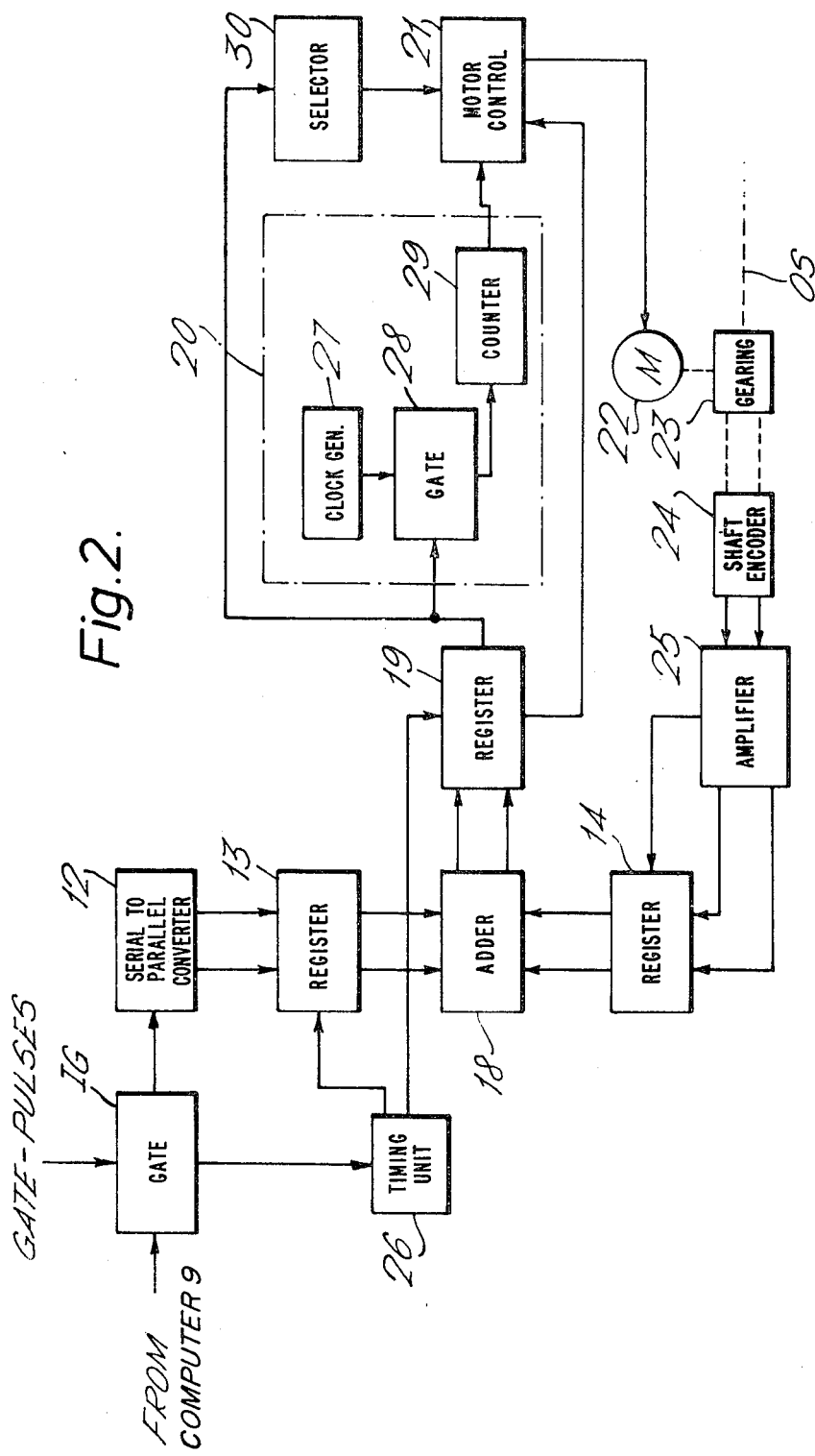
FIG. 2 is a schematic representation of the construction of each of two servo systems used in the instrument of FIG. 1.

Referring to FIG. 2, each representation of Mach number or airspeed selected by the gate IG of the servo system is converted in a unit 12 from serial to parallel binary form, and is then used to update the content of a register 13. Thus the content of the register 13 is updated repeatedly throughout operation in accordance with the results of the successive computations performed by the computer 9 in respect of the relevant variable.

The content of the register 13, representing the newly-computed value of Mach number or airspeed, as the case may be, is compared with the indicated value of the same speed-variable, as this is represented by the content of a register 14. The content of the register 14 is updated repeatedly in accordance with the rotational position of the output shaft OS of the servo system coupled either to the pointer 3 or counter 5. The complement of the content of the register 14 is added to the content of the register 13 in an adder 18 so as to derive the difference between the computed and indicated values of the relevant speed-variable. The binary representation of this difference or error is entered from the adder 18 into a register 19.

A unit 20 supplies pulses to a motor-control unit 21 at a rate proportional to the error-content of the register 19. The unit 21 is supplied with a signal that signifies the sense of the error-content of the register 19 and in accordance with this and the pulses supplied from the unit 20 derives an appropriate sequence of command signals for application to a stepping motor 22. The motor 22 drives the output shaft OS through step-down gearing 23 at a speed determined by the pulse rate supplied by the unit 21 and in the appropriate direction to reduce the error between the computer and indicated values of the relevant speed-variable. Feedback of the new indicated value is provided from coarse and fine outputs of a shaft-encoder 24 that is also driven by the motor 22 via the gearing 23. The binary-code representation provided by the encoder 24 is supplied via an amplifier unit 25 to update the content of the register 14 with each motor step.

The contents of the registers 13 and 19, are updated in a recurrent cycle synchronised to operation of the input-data IG by a timing unit 26. The unit 26 acts to ensure that the content of the register 19 is not updated in the cycle until after a new representation is received from the air-data computer 9 and entered in the register 13. Thus until a new representation of the relevant speed-variable is entered into the register 13, the same pulse rate is applied from the unit 20 to command the same stepping-speed of the motor 22, irrespective of reduction of the actuator error (between computed and indicated values) that may have been accomplished. The register 19 is updated to allow change of the stepping speed demanded of the motor 22 via the units 20 and 21 only following each updating of the register 13. A steady stepping speed is therefore established commensurate with the error existing when the updating of the register 13 takes place, and this speed is varied only in accordance with the error at the next updating. In this way a steady change of the value of the relevant speed-variable signal signalled by the air-data computer 9 throughout successive updatings of the register 13, gives rise to a steady stepping-speed demand with consequent close, smooth following in the output drive provided.

The pulse-rate unit 20 includes a clock-pulse generator 27, and this generates a train of equi-spaced clock pulses at the pulse rate NF (when N is for example 16, and F is the maximum stepping speed required of the motor 22). A pulse-gating unit 28 acts to pass all the generated pulses on to the motor-control unit 21 via a pulse counter 29 whenever the error is commensurated with the maximum stepping speed F required, and otherwise to block certain of the pulses of the train in accordance with the rate appropriate to the error staticized by the register 19. The counter 29 acts as a pulse-rate divider with a division factor N, and so the pulse rate of the pulse train applied from the counter 29 to the unit 21 lies within the appropriate range up to F. However this pulse train has a more regular and equalized pulse distribution than otherwise would be the case, by virtue of the application of the pulse blocking to the higher-rate train. This more regular and equalized pulse distribution assits significantly in the achievement of smooth drive to the pointer 3 or counter 5, as the case may be.

The magnitude of the error staticized in the register 19 is used to regulate the magnitude of the energizing voltage supplied to the stepping motor 22. To this end the staticized error is applied to a selector unit 30, and while the error magnitude is small the unit 30 selects and applies to the motor 22 energizing voltage to the normal operational rating of the motor 22. However when the error magnitude is large and the stepping speed required is high, as occurs particularly in the case of the servo system 7 when the setting of the selector switch 8 is changed, then an increased value of voltage is selected by the unit 30 to energize the motor 22. This enables a high current to be drawn for rapid acceleration of the motor 22 in such circumstances. More than just two levels of energizing voltage could be utilized for different levels of error if desired.

It is readily possible to arrange that change of setting of the switch 8 produces a change in the instrument display in order that misunderstanding as to the significance of the reading provided by the counter 5 may be obviated. For example, it may be arranged that the legend MACH/KNOTS on the dial 1 and closely associated with the window 6, is normally only partially visible so as to reveal MACH or KNOTS as appropriate to the setting; a simple flag-movement operated from the switch 8 may be readily used to this end. Furthermore the switch 8 itself may be located as indicated in broken outline 8' in FIG. 1, at the front of the instrument, and may have the form of a pushbutton switch.

Although an instrument using servo drive to both the pointer and counter has been described, other means for deriving drive in accordance with Mach-number and airspeed representations may be used.

We claim:

1. An aircraft-speed indicating instrument including an index that is moveable against a scale to provide a reading of airspeed, and a digital indicator, and wherein the digital indicator is arranged to provide selectively either a digital reading of Mach number or of said airspeed.

2. An aircraft-speed indicating instrument according to claim 1, wherein the readings provided by said digital indicator and said index are controlled by first and second control means respectively, and wherein said first control means is selectively operable to provide an output to said digital indicator indicative of either Mach number or airspeed.

3. An aircraft-speed indicating instrument according to claim 2, wherein said first control means is supplied with a signal containing information representative of both Mach number and airspeed, and includes first gating means and first responsive means, the first gating means being selectively operable to pass to the first responsive means either those parts of said signal which contain information representative of Mach number or those parts of said signal which contain information representative of airspeed.

4. An aircraft-speed indicating instrument according to claim 3, wherein said signal is a multiplexed electrical signal.

5. An aircraft-speed indicating instrument according to claim 4, including gate operating means for providing first and second pulsed gating signals which are synchronised with those parts of the multiplexed electrical signal containing information representative of Mach number and those parts of the multiplexed electrical signal containing information representative of airspeed respectively, and switch means for selectively supplying either said first or said second pulsed gating signals to the said first gating means of said first control means thereby to operate said first gating means and pass those parts of said multiplexed electrical signal representative of Mach number or airspeed in dependence upon the setting of said switch means.

6. An aircraft-speed indicating instrument according to claim 5, wherein said second control means is supplied with said multiplexed electrical signal and includes second gating means and second responsive means, the second gating means being operable to pass to the second responsive means only those parts of said multiplexed electrical signal which contain information representative of airspeed.

7. An aircraft-speed indicating instrument according to claim 6, wherein said second gating means is supplied with said second pulsed gating signal from said gate operating means thereby to operate said second gating means and pass to the said second responsive means only those parts of said multiplexed electrical signal which contain information representative of airspeed.

8. An aircraft-speed indicating instrument according to claim 7, wherein said switch means comprises a manually-operable switch located on the front face of the instrument.

9. An aircraft-speed indicating instrument according to claim 8, wherein the digital indicator is a digital-drum counter.

* * * * *